United States Patent
Krökel et al.

[11] Patent Number: 5,668,300
[45] Date of Patent: Sep. 16, 1997

[54] CALIBRATION PROCESS FOR SETTING THE SWITCHING POINT OF A SENSOR

[75] Inventors: Dieter Krökel, Meckenbeuren; Rolf Fensterle, Kehlen, both of Germany

[73] Assignee: I F M Electronic GmbH, Essen, Germany

[21] Appl. No.: 609,432

[22] Filed: Mar. 1, 1996

[51] Int. Cl.$^6$ .................................................. G01L 27/00
[52] U.S. Cl. ................................................. 73/1.01
[58] Field of Search ............................ 73/1 R, 1 B, 1 D, 73/1 E, 1 H; 324/202, 601

[56] References Cited

U.S. PATENT DOCUMENTS

5,359,877  11/1994  Loutsinen et al. ..................... 73/1 R

FOREIGN PATENT DOCUMENTS

| 0 157 997 | 10/1985 | European Pat. Off. . |
| 38 37 192 | 5/1989 | Germany . |
| 38 09 436 | 10/1989 | Germany . |
| 42 36 559 | 4/1994 | Germany . |
| 42 27 727 | 9/1994 | Germany . |
| 43 24 590 | 1/1995 | Germany . |

OTHER PUBLICATIONS

"FX-7 Series Fiber Optic Sensors", SUNX, pp. 2–18.
"Prüf–und Justageanlage für Fehlerstromschutzschalter", Martin Beck, 1992, pp. 1082–1085.

*Primary Examiner*—Robert Raevis
*Attorney, Agent, or Firm*—Sixbey, Friedman, Leedom & Ferguson; David S. Safran

[57] ABSTRACT

A calibration process for setting the switching point of a sensor which produces an output signal depending on whether a switching point has been exceeded or has not been reached by a sensor signal produced by a condition being sensed exceeds the switching point, and in which the value of the switching point is determined using the values of the sensor signal in the uninfluenced and in the influenced state. Operating reliability of the sensor is improved by determining the location of the switching point during the calibration process under the condition of essentially identical operating reserves of the sensor in the uninfluenced and in the influenced state.

18 Claims, 8 Drawing Sheets

CALIBRATION PROCESS FOR SETTING THE SWITCHING POINT OF A SENSOR

BACKGROUND OF THE INVENTION

1. Field of the Invention

The invention relates to a process for setting the switching point of a sensor in which, depending on whether the switching point has been exceeded or has not been reached by the sensor signal, an output signal is controlled, and in which the location of the switching point is determined during a calibration process using the values of the sensor signal in the uninfluenced and in the influenced state.

2. Description of Related Art

In known processes (see the SUNX FX-7 Series fiber optic sensor brochure, especially pages 2, 4 & 5), the location of the switching point during the calibration process is set to the average of the values of the sensor signal in the uninfluenced and in the influenced state. This known setting of the location of the switching point is indeed the most common circumstance, but it cannot ensure optimum operating conditions of the sensor.

The described known process for setting the switching point of a sensor is problematical mainly in that the same percentage changes of the sensor signals in the uninfluenced state, i.e., in the state in which the sensor is only minimally influenced by the object to be detected, and in which background signals play an important part, and in the influenced state, i.e., in the state of maximum influence of the object to be detected by the sensor, have different effects on the operating reliability of the sensor. If, for example, the sensor signal in the uninfluenced state is 0.2 V and is 1 V in the influenced state, the switching point is located at 0.6 V according to the described known process for setting the switching point of a sensor. Determination of the switching point according to the described known process, thus, leads to very different operating reserves (stability margin) of the sensor in the influenced and in the uninfluenced state. The concept of operating reserve (BTR) is based on the following definition:

$$BTR(S) = (S - S_{SP})/S_{SP} \cdot 100\% \quad (S > S_{SP})$$

$$BTR(S) = (S_{SP} - S)/S \cdot 100\% \quad (S < S_{SP})$$

S = sensor signal
$S_{SP}$ = switching point

In this example, the operating reserve in the uninfluenced state of the sensor is 200%, while the operating reserve in the influenced state of the sensor is only 66%. This is a disadvantage for the operating reliability of the sensor, since a change of the sensor signal in the influenced state, for example, due to dirty optics of an optical proximity switch, has a greater effect on the operating reliability of the sensor than a change of the sensor signal in the uninfluenced state, for example, based on an increased background signal. Since, generally, the probability of a change of the sensor signal in the uninfluenced state and in the influenced state is roughly the same, this is undesirable.

SUMMARY OF THE INVENTION

Thus, a primary object of the present invention is to provide a process for determining the location of the switching point of a sensor such that the operating reliability of the sensor is ensured, at least essentially, in the optimum manner.

The aforementioned object is achieved according to the invention by determining the location of the switching point during the calibration process under the condition of essentially identical operating reserves of the sensor in the uninfluenced and in the influenced state. Consequently, according to the invention, it is ensured that, for any values of the sensor signal in the uninfluenced state and in the influenced state, the location of the switching point is selected such that the operating reserves at least essentially agree. Thus, the operating reliability of the sensor is significantly increased.

Assuming that the operating reserve (stability margin) of the sensor in the uninfluenced state and in the influenced state should exactly agree, it is found mathematically that the location of the switching point during the calibration process is selected especially advantageously according to the square root of the product of the sensor signal in the uninfluenced state and the sensor signal in the influenced state. That is:

$$S_{SP} = \sqrt{S_{NB} \cdot S_B}$$

The aforementioned embodiment of the process according to the invention conceals the problem that, as the sensor signal disappears in the uninfluenced state, the switching point of the sensor is set to 0. To preclude this undesirable case in which the operating reliability of the sensor is greatly limited, the process according to the invention, advantageously, performed so that the location of the switching point does not fall below a stipulated minimum value.

In an especially advantageous embodiment of the process according to the invention, the location of the switching point during the calibration process is chosen according to the sum of the sensor signal in the uninfluenced state and ⅜ times the difference between the sensor signal in the influenced state and the sensor signal in the uninfluenced state. That is:

$$S_{SP} = S_{NB} + \tfrac{3}{8}(S_B - S_{NB})$$

Even with a small sensor signal in the influenced state, therefore, in the critical range, this choice of the location of the switching point yields almost identical operating reserves of the sensor in the uninfluenced and in the influenced state. Since the described choice represents only an approximation of the mathematically exact choice, the operating reserves of the sensor in the uninfluenced and in the influenced state for relatively high sensor signals in the influenced state differ clearly from one another. This is, however, not critical since, in this case, relatively high operating reserves are available anyway. In the described choice, moreover, it is precluded that the location of the switching point assumes a value of 0.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
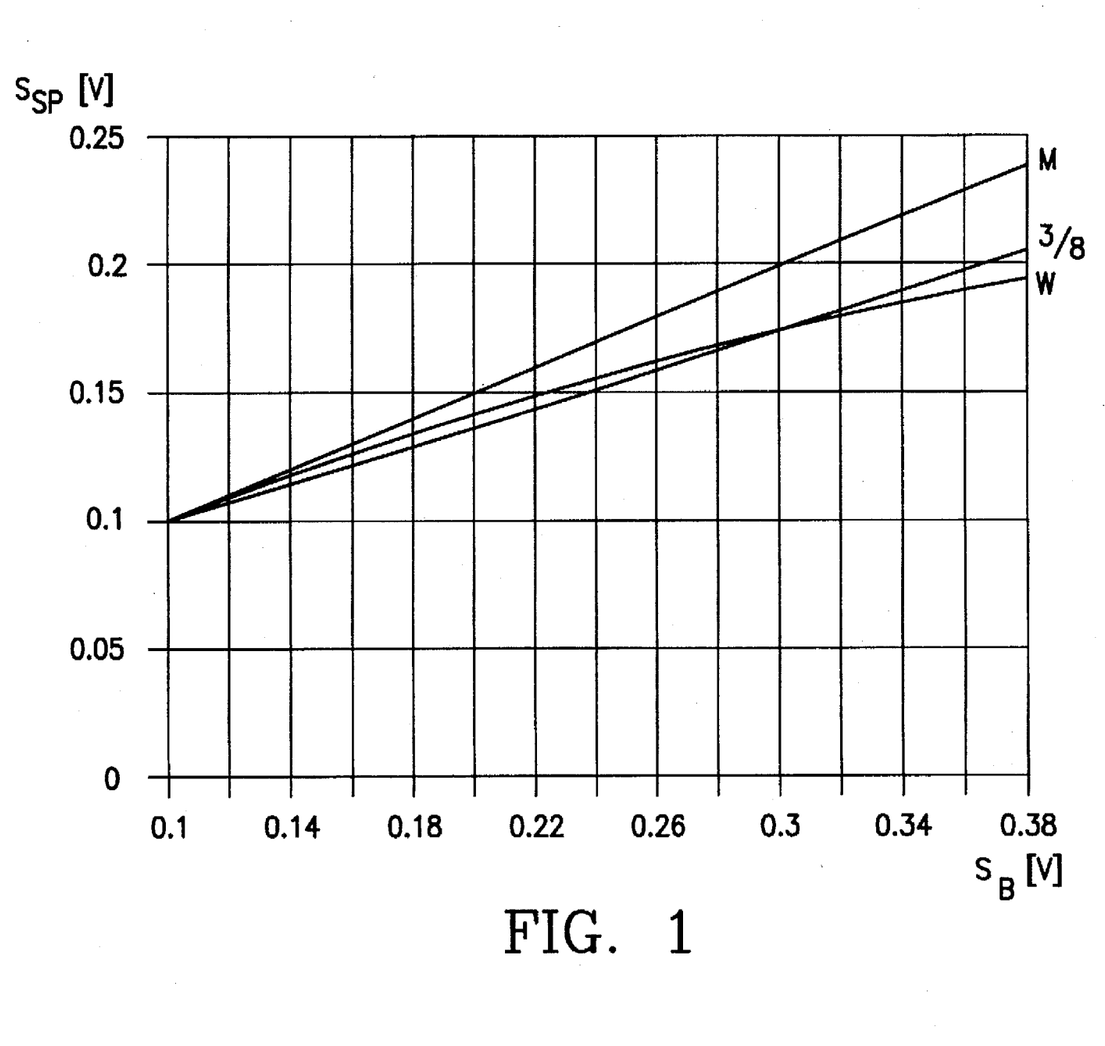
FIG. 1 is a graphic showing the location of the switching point as function of the sensor signal in the influenced state for a known process and for first and second embodiments of the process according to the invention.

FIG. 1 shows the location of the switching point of a sensor as a function of a sensor signal in the influenced state $S_B$ for a known process and for first and second embodiments of the process according to the invention. In the location of the switching point $S_{SP}$ shown in FIG. 1, the sensor signal in the uninfluenced state is a constant 0.1 V, as in following figures. The sensor signal in the influenced state $S_B$ is between 0.1 and 0.38 V, i.e., the sensor is only weakly influenced here. The location of the switching point $S_{SP}$ for the known process described initially is labelled M. In this process, the switching point is determined as the arithmetic mean of the values of the sensor signal in the uninfluenced state and in the influenced state. The location of the switching point $S_{SP}$ depending on the sensor signal in the influenced state $S_B$ is labelled W for the first embodiment of the process according to the invention.

In the first embodiment of the inventive process, W, the location of the switching point $S_{SP}$, is selected during the calibration process according to the square root of the product of the sensor signal in the uninfluenced state and the sensor signal W in the influenced state, that is, according to the relationship: $S_{SP}=\sqrt{S_{NB}}\cdot S_B$. In the second embodiment of the process according to the invention, shown in FIG. 1, the location of the switching point $S_{SP}$, during the calibration process is selected according to the sum of the sensor signal in the uninfluenced state and ⅜ times the difference between the sensor signal in the influenced state $S_B$ and the sensor signal in the uninfluenced state, i.e., $S_{SP}=S_{NB}+⅜(S_B-S_{NB})$. This behavior of the location of the switching point $S_{SP}$ is labelled ⅜. As is clearly shown in FIG. 1, the behaviors of the location of the switching point $S_{SP}$ for the first and second embodiment with little influence on the sensor W and ⅜ essentially agree, while the behavior of the location of the switching point $S_{SP}$ according to the known process M is clearly above the behaviors of the processes W and ⅜ according to the invention.

Figure 2:
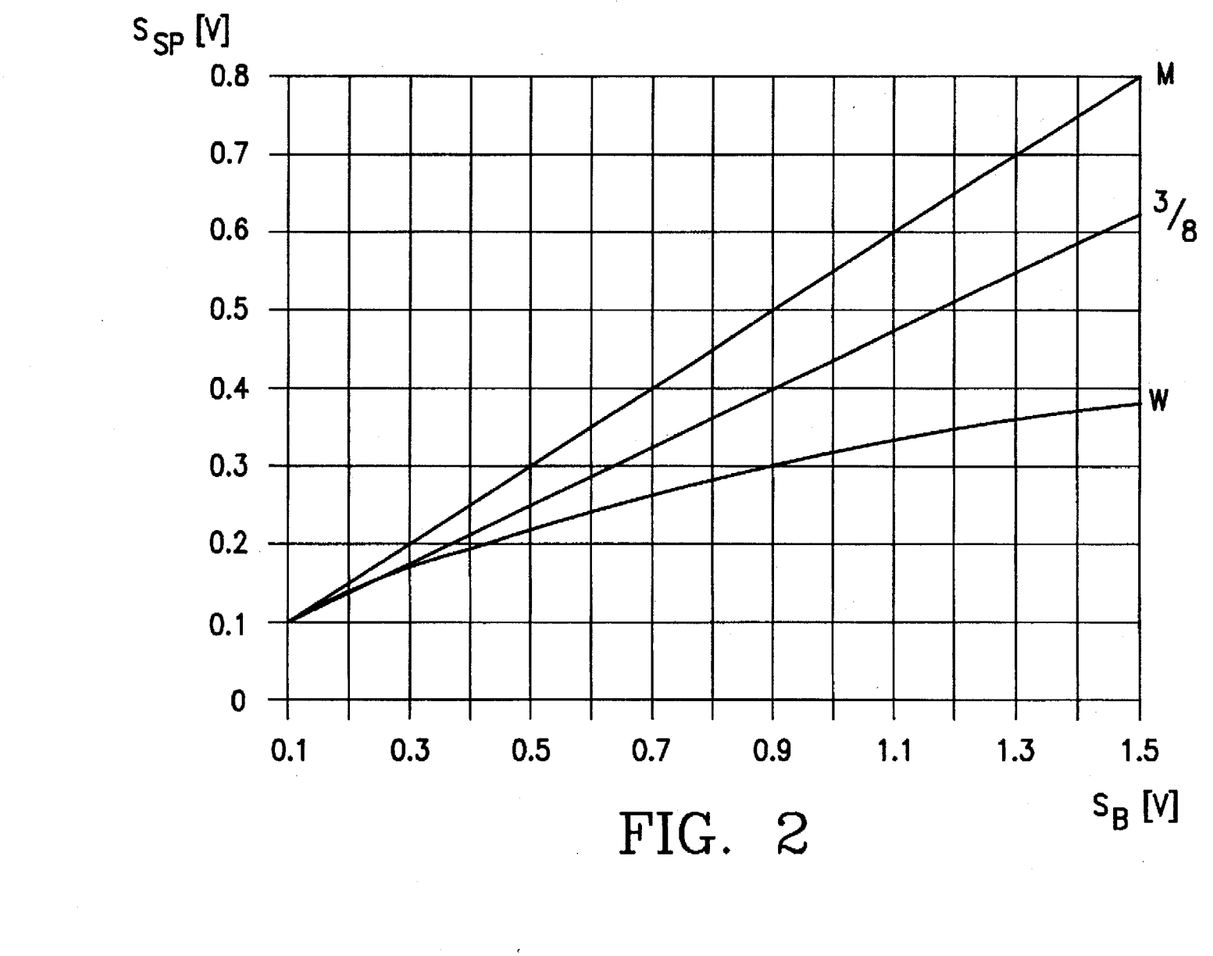
FIG. 2 are plots of the location of the switching point as a function of the sensor signal in the influenced state for the known process and the first and second embodiments of the process according to the invention.

FIG. 2 under the same conditions as FIG. 1, shows the location of switching point $S_{SP}$ as a function of the sensor signal in the influenced state $S_B$ for the known process M and the first and second embodiments of the process according to the invention, W and ⅜, with the difference that the sensor is more strongly influenced, specifically between 0.1 and 1.5 V. FIG. 2 clearly shows, on the one hand, that the location of the switching point $S_{SP}$ for stronger influences on the sensor deviates greatly from the ideal behavior according to the first embodiment of the invention, W, for both the known process M as well as in the second embodiment of the process according to the invention, ⅜. For the relatively strong influences on the sensor shown in FIG. 2, however, the operating reliability of the sensor is not as strongly dependent on the operating reserve as with weaker influences on the sensor. In the signal range of the sensor signal clearly shown in FIG. 2, therefore, the behavior of the switching point $S_{SP}$ according to the second embodiment of the invention, ⅜, can still be considered to be good.

Figure 3:
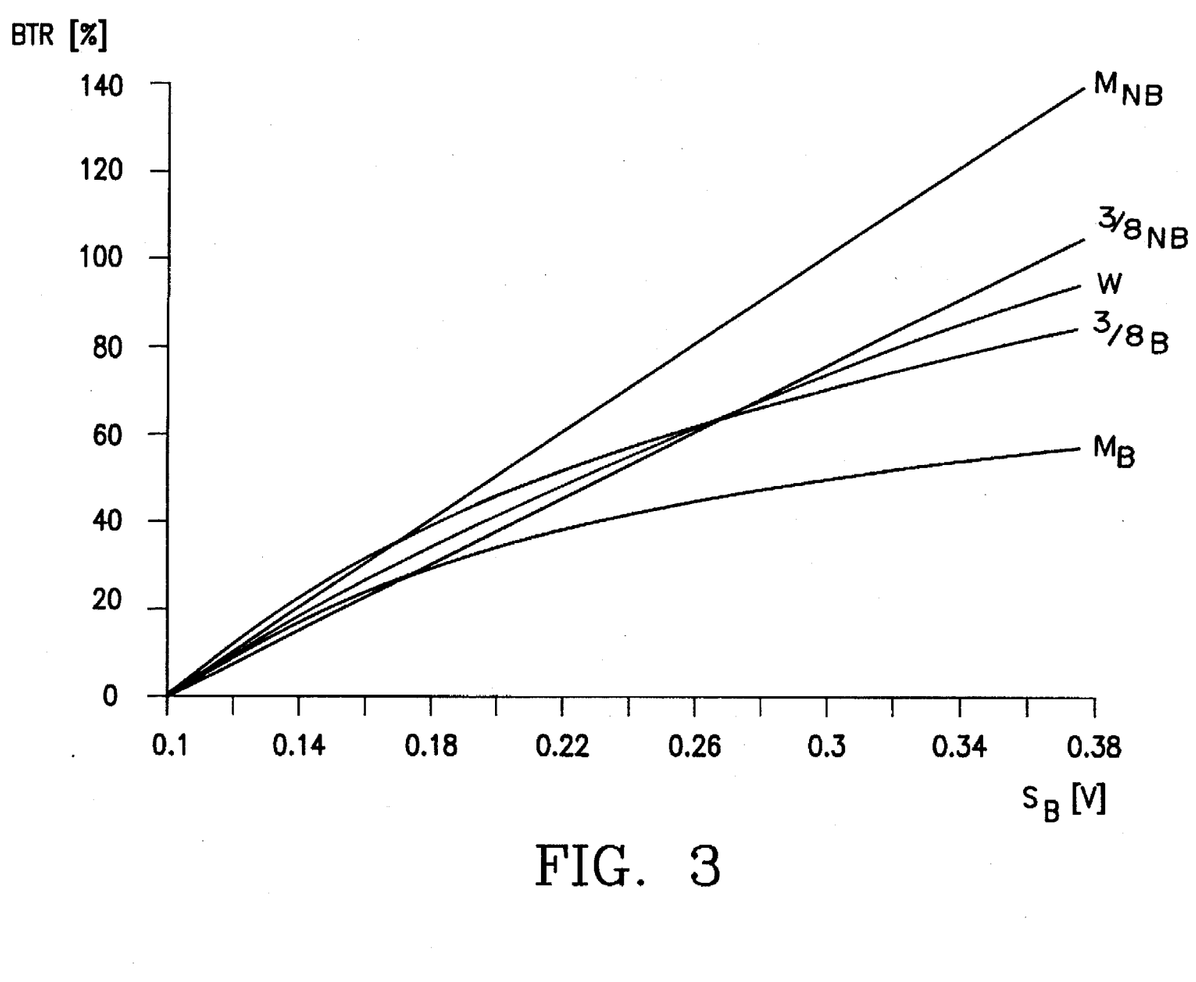
FIG. 3 shows the behavior of the operating reserve as a function of the sensor signal in the influenced state for the known process and the first and second embodiments of the process according to the invention.

FIG. 3 shows the behavior of the operating reserve (stability margin) BTR in percent depending on the sensor signal in the influenced state $S_B$ for the known process M and for the first and second embodiments of the invention, W and ⅜. For the known process, as well as the second embodiment of the invention, ⅜, the behavior of the operating reserve BTR varies depending on whether the operating reserve BTR is represented in the uninfluenced state or the influenced state; the state being indicated by the subscript NB for the uninfluenced state and B for the influenced state in the labelling of the behaviors. It is clearly recognizable that, for the case of the weak influence on the sensor shown here, the operating reserves BTR in the known process M vary greatly between the uninfluenced state and the influenced state. This strong variation adversely affects the overall operating reliability of the sensor to a significant degree. It can be clearly recognized in the behaviors of the operating reserves BTR according to the first and second embodiments of the invention ⅜ and W that, in the first process according to the invention, W, the operating reserve BTR in the uninfluenced and influenced state does not vary at all, while the operating reserve BTR in the second embodiment of the invention, ⅜, fluctuates only in a tolerable range between the uninfluenced and influenced state.

Figure 4:
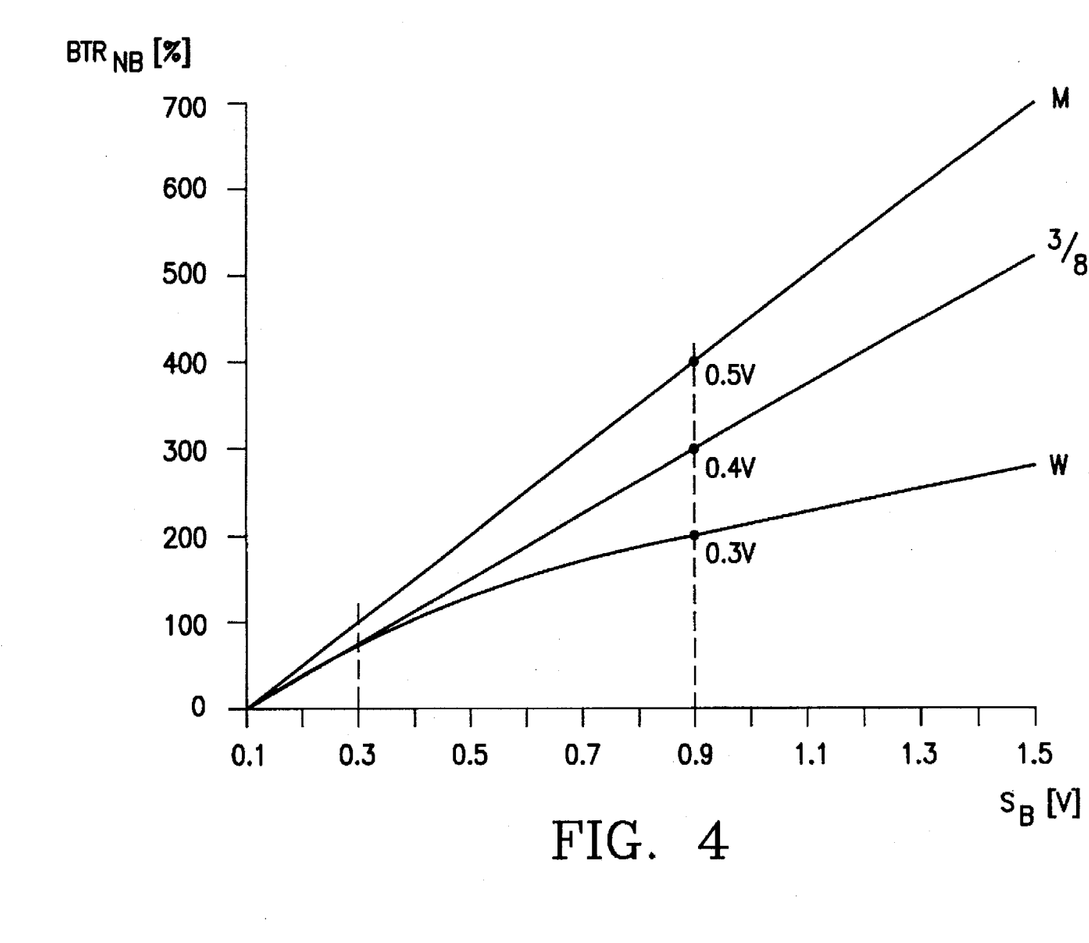
FIG. 4 shows the behavior of the operating reserve in the uninfluenced state as a function of the sensor signal in the influenced state for the known process and first and second embodiments of the process according to the invention.
Figure 5:
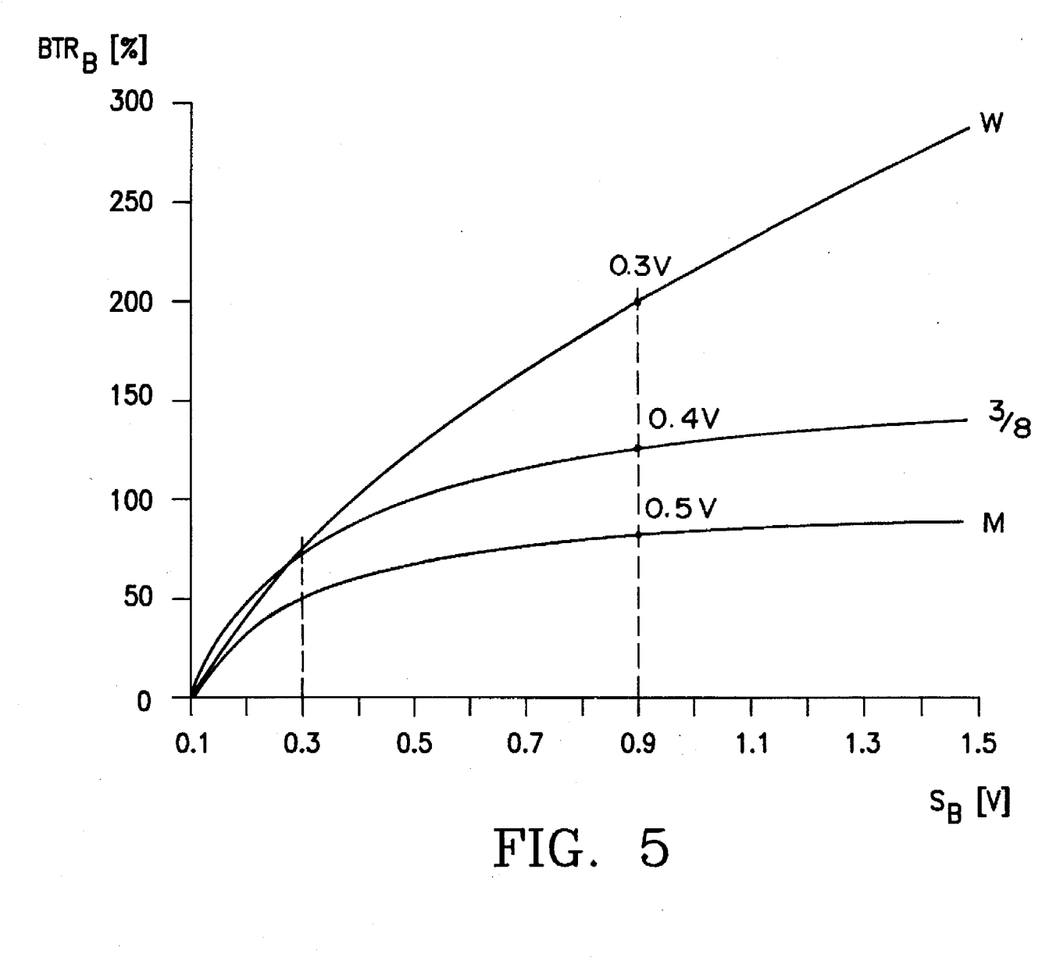
FIG. 5 are plots showing the behavior of the operating reserve in the influenced state as a function of the sensor signal in the influenced state for the known process and the first and second embodiments of the process according to the invention.

FIG. 4 shows the behavior of the operating reserve BTR depending on the sensor signal in the influenced state $S_B$ for the known process M and the first and second embodiments of the invention W and ⅜ relative to the uninfluenced state with a strong influence on the sensor up to 1.5 V. For a value of 0.9 V for the sensor signal in the influenced state $S_B$, the ascertained switching points $S_{SP}$ are shown in FIG. 4. It is clearly recognizable that according to the known process M, a relatively high value for the switching point is determined, i.e., $S_{SP}=0.5$ V. This necessarily leads to a very high operating reserve relative to the sensor signal in the uninfluenced state. The two embodiments of the process according to the invention, W and ⅜, deliver clearly lower values for the switching point $S_{SP}$, and thus, also lower values for the operating reserve BTR. As is immediately apparent from FIG. 5, which corresponds to FIG. 4 except for the fact that the operating reserve BTR is shown relative to the sensor signal in the influenced state, the high switching threshold S $_{SP}$ which is determined according to the known process leads to a strongly reduced operating reserve BTR relative to the sensor signal in the influenced state. Conversely, especially in the first embodiment of the process according to the invention, W, a high operating reserve BTR is ensured also relative to the sensor signal in the influenced state—this applies, even if to an attenuated degree, also to the second embodiment of the process according to the invention, ⅜.

Figure 6:
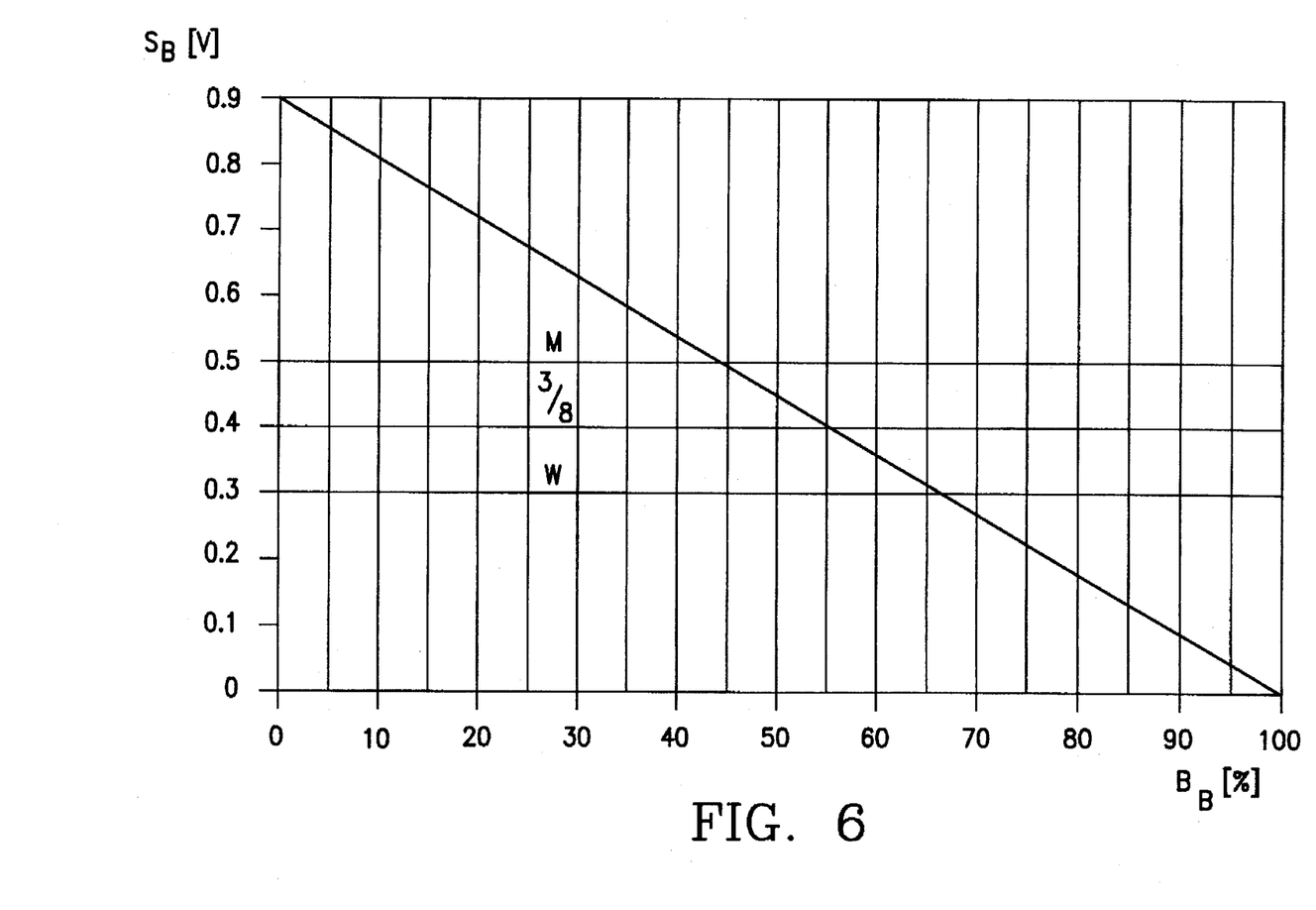
FIG. 6 is a graph depicting the operating reliability of a sensor depending on the impairment of the sensor signal in the influenced state for the known process and the first and second embodiments of the process according to the invention.

To illustrate the behavior of the operating reliability, FIG. 6 shows the sensor signal in the influenced state $S_B$ as a function of up to 100% impairment, B, for example by dirt, with a relatively high level of influence on the sensor. Here, it can be clearly recognized that the two embodiments of the process according to the invention, W and ⅜, ensure a usable operating reliability compared to the known process M, up to a clearly higher degree of impairment of the sensor signal in the influenced state $B_B$. In particular, the first embodiment of the invention W enables sufficient operating reliability up to an impairment of roughly 60%.

Figure 7:
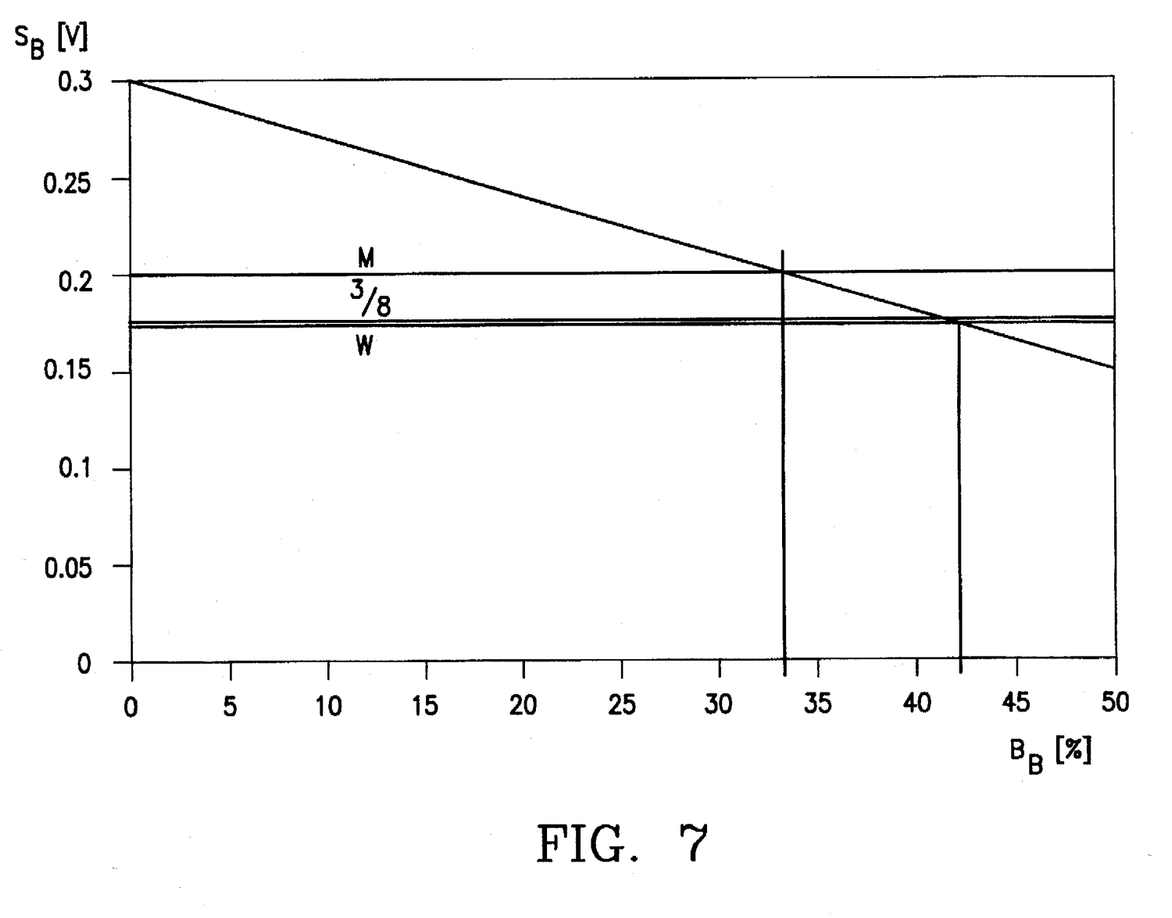
FIG. 7 shows the operating reliability of a sensor as a function of the impairment of the sensor signal in the influenced state for the known and the first and second embodiments of the process according to the invention.

FIG. 7 shows the case corresponding to that shown in FIG. 6, only for the case of weak influence on the sensor. Also in this case can the advantage of the two embodiments of the inventive processes, W and ⅜, be clearly recognized as compared to the known process M with respect to operating reliability as the impairment of the sensor signal increases. The difference between the two embodiments of the invention, W and ⅜, is hardly perceptible, here, on the other hand.

Figure 8:
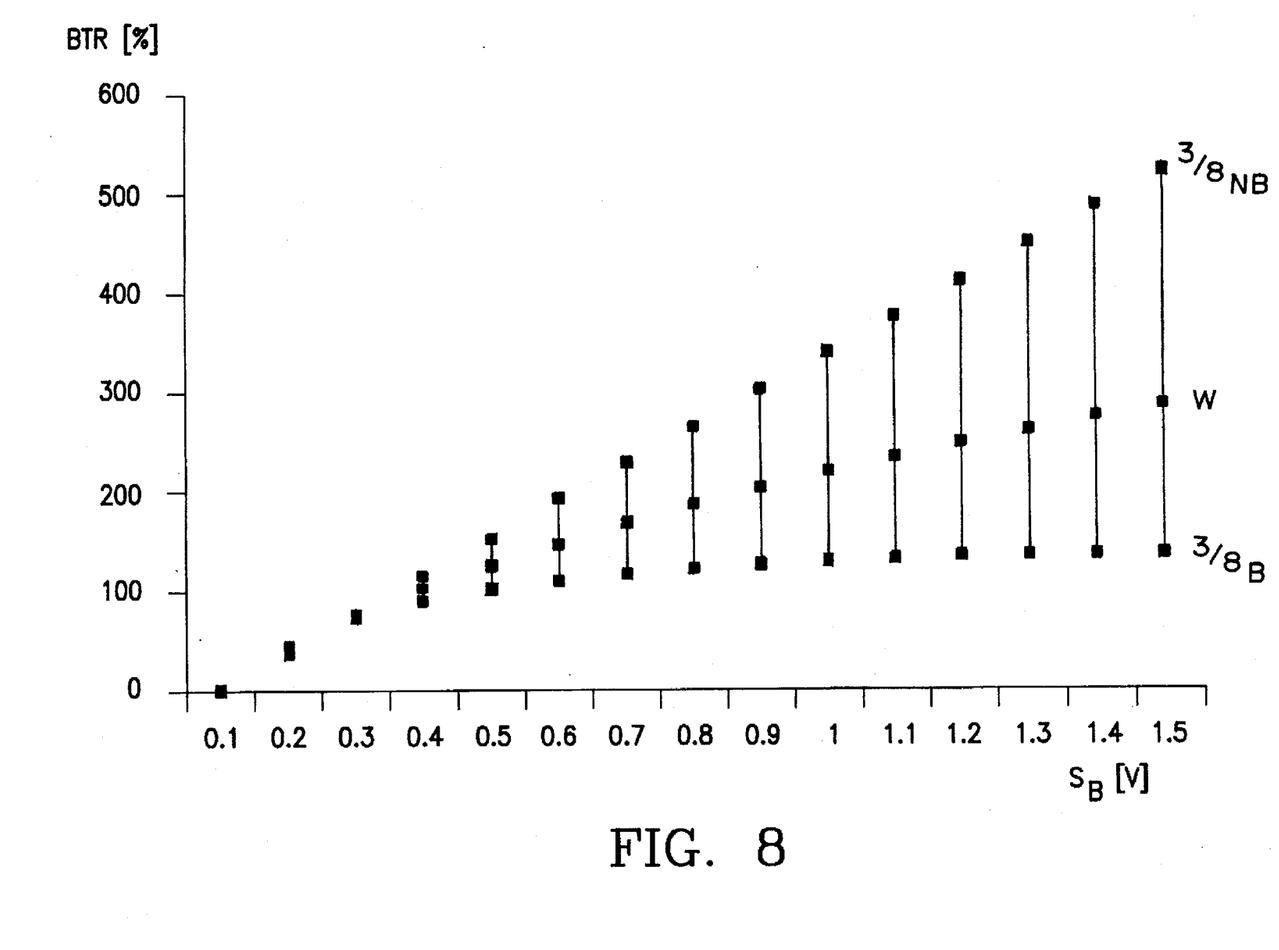
FIG. 8 are plots depicting the behavior of the operating reserve as a function of the sensor signal in the influenced state for the first and second embodiment of the process according to the invention.

Finally, FIG. 8 shows the behavior of the operating reserve BTR as a function of the sensor signal in the influenced state $S_B$, again, for a sensor signal in the uninfluenced state of 0.1 V for the first embodiment of the invention W. In comparison, the different behaviors of the operating reserves BTR are dependent on whether they are referenced to the sensor signal in the uninfluenced state or in the influenced state, shown for the second embodiment of the process of the invention ⅜. It becomes clear again from FIG. 8 that, for weak influences on the sensor, the first and second embodiment of the inventive process, W and ⅜, yield essentially identical results for the operating reserve BTR, while for stronger influences on the sensor, the second embodiment ⅜ drops relatively clearly compared to the first embodiment according to the invention W. This drop of the second embodiment ⅜ as compared to the first embodiment W is, however, not especially problematic since, for stronger influences of the sensor, a relatively high signal range is available, and thus, the values for the operating reserve BTR are still in regions which can be considered noncritical. The advantage of the second embodiment ⅜ as compared to the first embodiment W lies clearly in its simple mathematical implementation, especially via a simple integrated circuit.

According to a first alternative, the described switching point setting processes can be performed in a static calibration process. In this case, a user initiates the calibration process, for example, by actuating a sensor button. Then, the user places the object to be detected in front of the sensor and acknowledges that the object has been placed, for example, again by pressing a button. Then, the evaluation electronics of the sensor determines the sensor signal in the influenced state and stores it.

At this point, the user removes the object and acknowledges this process again, for example, by pressing a button. The evaluation electronics of the sensor now determines the sensor signal in the uninfluenced state and stores it. Using the sensor signals thus stored in the uninfluenced and in the influenced state, the evaluation electronics of the sensor now determines the location of the switching point according to the process according to the invention, which is decisive for further operation of the sensor.

According to one especially advantageous second alternative, the process according to the invention is embodied in a dynamic calibration process. In a dynamic calibration process, it is ensured that the process to be monitored, for example, a tape which is running past, does not have to be interrupted in order to perform the calibration process. In a dynamic calibration process, the sensor signal is recorded periodically (for example, every 500 microseconds) over a certain time interval (for example, 100 ms) with a conventional measuring device. During this time interval, the evaluation electronics stores the maximum measured sensor signal, therefore the sensor signal in the uninfluenced state, in which the sensor signals in the uninfluenced and in the influenced state can be determined either in two time intervals which are triggered in succession or within a single time interval. From these two values, the evaluation electronics of the sensor, in agreement with the static calibration process, determines the location of the switching point according to the process according to the invention. In the 100 ms time interval chosen as an example, of course, only processes with a frequency of more than 10 Hz can be calibrated. For slower processes, this time interval must be accordingly lengthened.

Both the static calibration process as well as the dynamic calibration process can be improved by the fact that, during a calibration process, several sensor signals are recorded in the uninfluenced and in the influenced state, and that the location of the switching point is determined using the averages of the sensor signals in the uninfluenced and in the influenced state. This measure guarantees that possible inaccuracies in the recording of the sensor signals are averaged out in the result.

If high operating reliability of the sensor is to be ensured over a long time interval, the process according to the invention is embodied especially advantageously by periodically repeating the calibration process. Depending on the application, this can be done hourly, daily, monthly or annually.

Alternatively to a periodically repeated calibration process, it is possible that a calibration process is triggered when the lower value of the operating reserve falls below a limit value. For example, a calibration process could be triggered if one of the two operating reserves falls below a limit value of 50%.

Repeatedly, the problem arises that the user must ascertain how the instantaneous operating state of the sensor is constituted. To do this, the process according to the invention is especially advantageously embodied by displaying the operating reserve after the calibration process and/or after each switching process.

If the operating reserve is displayed after each switching process, it is advantageous at higher switching frequencies of the sensor to display only the lower value of the operating reserve of the sensor since otherwise the readability of the operating reserve suffers.

One especially preferred version of the display of the operating reserve takes place using a LED strip. In this case, for example, the operating reserve is displayed with five LEDs. As long as the operating reserve is greater than or equal to the operating reserve assigned to one LED, this LED and all LEDs under it light.

In particular, there are now a host of possibilities for embodying and developing the process according to the invention for setting the switching point of a sensor.

While various embodiments in accordance with the present invention have been shown and described, it is understood that the invention is not limited thereto, and is susceptible to numerous changes and modifications as known to those skilled in the art. For example, the inventive process will find application to a wide range of sensors, not merely fiber optic sensors of the type represented by the above-mentioned SUNX sensors. Therefore, this invention is not limited to the details shown and described herein, and includes all such changes and modifications as are encompassed by the scope of the appended claims.

We claim:

1. Calibration process for setting a switching point of a sensor which produces an output signal depending on whether or not a sensor signal produced by a condition being sensed exceeds the switching point, comprising the steps of producing values of the sensor signal in an uninfluenced state and in an influenced state, and setting the switching point at a value at which an operating reserve of the sensor occurring in the uninfluenced state is approximately identical to an operating reserve occurring in the influenced state, at least for weak influences on the sensor.

2. Calibration process according to claim 1, wherein the value of the switching point at which approximately identical operating reserves of the sensor occur in the uninfluenced and in the influenced state is determined according to the relationship:

$$S_{SP} = \sqrt{S_{NB} \cdot S_B}$$

where $S_{SP}$ is switching point, $S_{NB}$ is the sensor signal in the uninfluenced state and $S_B$ is the sensor signal in the influenced state.

3. Calibration process according to claim 2, wherein the value of the switching point is set at predetermined minimum value if the determined value of $S_{SP}$ is approximately zero.

4. Calibration process according to claim 3, wherein the steps of producing values of the sensor signal in an uninfluenced and in an influenced state are performed under static conditions.

5. Calibration process according to claim 4, wherein several sensor signals are recorded in the uninfluenced state and in the influenced state; and wherein the value of the switching point is determined using averages of the sensor signals in the uninfluenced and in the influenced state.

6. Calibration process according to claim 5, wherein the calibration process is periodically repeated.

7. Calibration process according to claim 1, wherein the value of the switching point at which approximately identical operating reserves of the sensor occur in the uninfluenced and in the influenced state is determined according to the relationship:

$$S_{SP} = S_{NB} + \tfrac{3}{8}(S_B - S_{NB})$$

where $S_{SP}$ is switching point, $S_{NB}$ is the sensor signal in the uninfluenced state and $S_B$ is the sensor signal in the influenced state.

8. Calibration process according to claim 7, wherein the steps of producing values of the sensor signal in an uninfluenced and in an influenced state are performed under static conditions.

9. Calibration process according to claim 1, wherein the steps of producing values of the sensor signal in an uninfluenced and in an influenced state are performed under static conditions.

10. Calibration process according to claim 7, wherein the calibration process is triggered when a lowest value of the operating reserve falls below a limit value.

11. Calibration process according to claim 1, wherein the steps of producing values of the sensor signal in an uninfluenced and in an influenced state are performed under dynamic conditions.

12. Calibration process according to claim 11, wherein several sensor signals are recorded in the uninfluenced state and in the influenced state; and wherein the value of the switching point is determined using averages of the sensor signals in the uninfluenced and in the influenced state.

13. Calibration process according to claim 12, wherein the calibration process is periodically repeated.

14. Calibration process according to claim 11, wherein the calibration process is triggered when a lowest value of the operating reserve falls below a limit value.

15. Calibration process according to claim 1, wherein the value of the operating reserve to which the switching point is set is displayed at the end of the calibration process.

16. Calibration process according to claim 1, wherein the value of the operating reserve to which the switching point is set is displayed each time that the sensor signal is produced by the condition being sensed having exceeded the switching point.

17. Calibration process according to claim 16, wherein only the lowest value of the operating reserve of the sensor is displayed when the frequency at the sensor signal is produced by the condition being sensed having exceeded the switching point exceeds a predetermined rate.

18. Calibration process according to claim 16, wherein the value of the operating reserve to which the switching point is set is displayed using a LED strip.

* * * * *